March 12, 1957  A. L. STEIN  2,784,869
PORTABLE RECEPTACLE
Filed Dec. 20, 1954
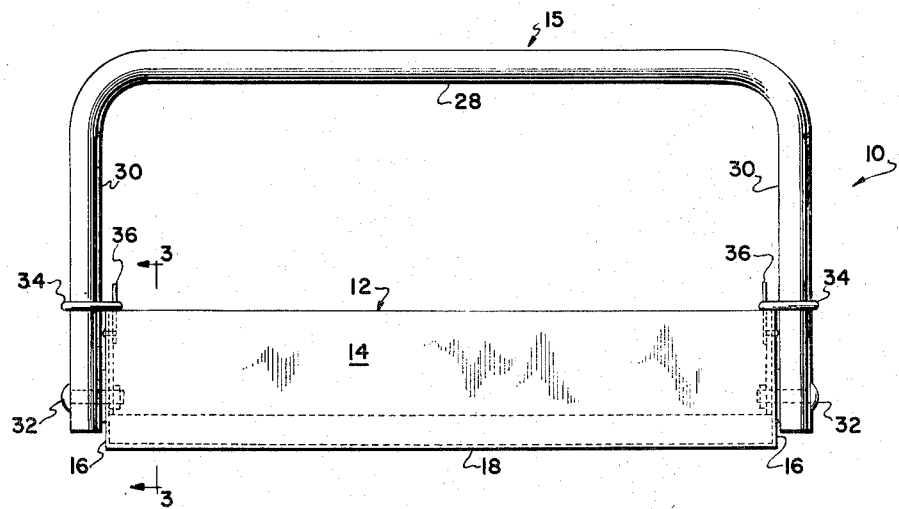
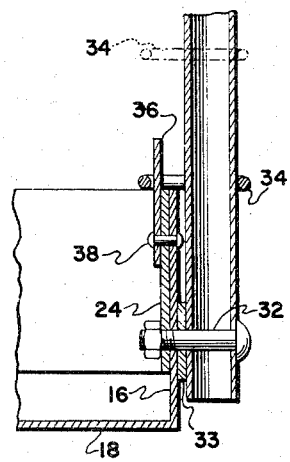
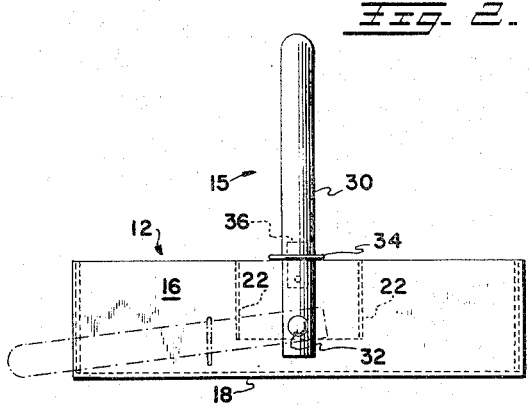
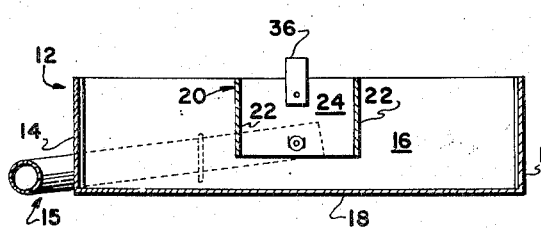
INVENTOR
ALBERT L. STEIN
Mead, Browne, Schuyler
& Beveridge
ATTORNEY

2,784,869
PORTABLE RECEPTACLE

Albert L. Stein, Atlanta, Ga.

Application December 20, 1954, Serial No. 476,398

4 Claims. (Cl. 220—96)

This invention relates to portable receptacles, and more particularly to a general utility portable receptacle or tray for carrying small articles.

It is an object of this invention to provide a portable receptacle or tray useful in carrying small articles, and especially for carrying small articles such as bottles of polish, for example, about the household.

It is another object of this invention to provide a portable tray having a pivoted handle which is rigidly maintained in upright position when in use but which may be swung downwardly to a substantially horizontal position when not in use in order to conserve space.

It is a further object of this invention to provide a portable tray provided with a pivotally mounted detachable handle and having a compartmentalized interior to permit segregation of articles carried by the tray.

It is still another object of this invention to provided a portable tray or receptacle which is simple in construction, economical to manufacture and which can be sold for a nominal price.

In achievement of these objectives, this invention provides a tray including a tray body having a base portion and side walls. The interior of the tray is provided with a plurality of compartments which permit segregation of various articles carried by the tray. A pivotally mounted handle member is connected to the tray body and is provided with a locking means which cooperates with a locking means on the tray body to maintain the handle in an upright position when in use. The cooperating locking means on the handle and on the tray body may be easily detached from one another to permit the handle to be swung downwardly to a substantially horizontal position when the handle is not in use.

Further objects and advantages of the invention will become apparent from the following description taken in conjunction with the accompanying drawing in which:

Fig. 1 is a side elevation view of a tray in accordance with the invention;

Fig. 2 is an end view of the tray of Fig. 1 with the handle member locked in upright position;

Fig. 3 is a view in vertical section along line 3—3 of Fig. 1 but with the handle in unlocked position and substantially horizontally disposed; and Fig. 4 is a fragmentary view in vertical section illustrating the details of the connection between the handle and the tray body.

Referring now to the drawing, the portable tray is generally indicated at 10 and comprises a generally hollow rectangular body member 12 and a handle member generally indicated at 15. Both the tray body 12 and handle 15 may be made of any suitable material, such as aluminum, for example, or of a suitable plastic material. Tray body 12 is provided with oppositely disposed longitudinally extending side walls 14 joined at their opposite ends by end walls 16. The tray body 12 is open at the top but is provided with a bottom base portion 18 integrally joined to the side walls 14 and end walls 16. The hollow interior of the tray body 12 is divided into three compartments by the use of an intermediate hollow rectangular compartment generally indicated at 20 open at both its bottom and top and spaced above base portion 18 of the tray body. The compartment 20 is provided with oppositely disposed spaced longitudinally extending walls 22 which extend parallel to side walls 14 of the tray body for the entire length of the tray body. Walls 22 are spaced equal distances on opposite sides of the longitudinal axis of the tray body and are joined at their oppoiste ends by transversely extending walls 24. Walls 24 abut the inner surface of end walls 16 of the tray body. The vertical height of compartment 20 is less than that of the tray body so that when the upper edges of compartment 20 are disposed flush with the upper edges of tray body 12, as shown in the drawing, the lower edges of compartment 20 are spaced above the base portion 18 of body 12.

The handle member generally indicated at 15 is formed of tubular stock and is of substantially U-shape, with a horizontally extending portion 28 and two oppositely disposed vertically extending legs 30. Handle 15 is pivotally secured to tray body 12 by means of bolts 32 which join the lower ends of the respective leg portions 30 of the handle to the end walls 16 of the tray body. Bolts 30 also pass through end walls 24 of the compartment 20. Suitable washer or spacer means 33 are disposed on bolt 32 between the inner surface of handle 15 and the outer surface of tray body 12.

In order to lock handle 15 in an upright position when it is desired to carry the tray, cooperating means are provided on the handle and on the tray body for locking the handle in position. A ring 34 is slidably disposed on each of the handle portions 30. A lug member 36 is rigidly attached, as by means of rivets 38, to the central portion of each of the ends of the tray, each lug 36 abutting the inner surface of an end portion 24 of the inner compartment 20. Rivets 38 also pass through the end walls of compartment 20 and thus secure compartment 20 in position with respect to tray body 12. Each lug 36 projects above the upper edges of the sides of the tray body. When ring 34 is slid downwardly on leg 30 of handle 26, the ring surrounds the lug 36 and thereby locks the handle in a vertical position. When the handle is not in use, the ring 34 may be slid upwardly on leg 30 so as to become disengaged from lug 36. The handle 26 may then be swung downwardly about its pivotal connection 32 to a substantially horizontal position as shown in Figs. 2 and 3.

It can be seen from the foregoing that there is provided in accordance with this invention a portable tray or receptacle which has great utility in carrying small articles. The tray is particularly useful for carrying small articles, such as bottles of polish, for example, about the household. The pivotally mounted handle may be locked in position when the tray is to be carried but may be easily disengaged from its locking relation with the tray body when the handle is not in use, thereby reducing the space occupied by the tray. Furthermore, the compartmentalized construction of the tray permits articles of various types to be separated from each other, as desired. The tray is very simple in construction and economical to manufacture and can be sold at a reasonable price.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. A portable receptacle comprising a body member having a base portion and side walls extending upwardly from said base portion, a generally U-shaped handle member pivotally connected adjacent said base portion to oppositely disposed side wall portions of said body member, slidable ring means movable on said U-shaped handle member, and means carried by a side wall adjacent an upper edge thereof and engageable with said ring means to maintain said handle in an upright position.

2. A portable receptacle comprising a body member having a base portion and side walls extending upwardly from said base portion, a generally U-shaped handle member having a pair of spaced leg portions, said leg portions being pivotally connected adjacent said base portion to oppositely disposed side wall portions of said body member, ring means slidably mounted on said handle member, projection means extending from a side wall portion adjacent an upper edge of said wall portion, said ring means being engageable with said projection means to maintain said handle in an upright position.

3. A portable receptacle comprising a body member having a base portion and side walls extending upwardly from said base portion, a generally U-shaped handle member, said handle member having a pair of spaced leg portions pivotally connected adjacent said base portion to oppositely disposed side wall portions of said body member, a slidable ring means disposed on each of said leg portions, and projection means carried by said oppositely disposed side wall portions adjacent an upper edge of said wall portions and engageable with said respective ring means to maintain said handle in an upright position.

4. A portable receptacle comprising a generally rectangular shaped body member having a base portion and side walls extending upwardly from said base portion, a handle member pivotally connected adjacent said base portion to oppositely disposed side wall portions, slidable ring means on said handle member, lug-like projections extending upwardly from oppositely disposed side wall portions adjacent an upper edge of said wall portions, said ring means engaging said projections to secure said handle in an upright position.

References Cited in the file of this patent

UNITED STATES PATENTS

| | | |
|---|---|---|
| 158,598 | Moore | Jan. 12, 1875 |
| 2,628,752 | Corkish | Feb. 17, 1953 |

FOREIGN PATENTS

| | | |
|---|---|---|
| 110,019 | Switzerland | Sept. 16, 1925 |